United States Patent [19]

Ryan

[11] 3,993,212
[45] Nov. 23, 1976

[54] ELECTRICAL OUTLET BOX
[76] Inventor: Allan F. Ryan, 26 Mason Road, R.R. No. 3, Masonville, Rawdon, Quebec, Canada, J0K 1S0
[22] Filed: Aug. 5, 1974
[21] Appl. No.: 494,880

[30] Foreign Application Priority Data
Aug. 7, 1973 Canada................................ 178215

[52] U.S. Cl.................................. 220/3.6; 174/58; 220/3.92; 220/3.94; 220/62
[51] Int. Cl.².......................................... H02G 3/12
[58] Field of Search........................ 220/3.2–3.94, 220/62; 174/58

[56] References Cited
UNITED STATES PATENTS

| | | | |
|---|---|---|---|
| 1,857,787 | 5/1932 | Meeks et al. | 220/3.4 X |
| 2,031,689 | 2/1936 | Buckels | 220/3.92 |
| 3,053,013 | 9/1962 | Fork | 220/3.4 X |
| 3,176,869 | 4/1965 | Kinney | 220/3.9 |
| 3,358,866 | 12/1967 | Kinney | 220/3.9 |
| 3,596,860 | 8/1971 | Mackay | 220/3.9 X |
| 3,877,601 | 4/1975 | Evans et al. | 220/62 X |

Primary Examiner—William Price
Assistant Examiner—Stephen Marcus
Attorney, Agent, or Firm—Shlesinger, Arkwright, Garvey & Dinsmore

[57] ABSTRACT

An improved electrical outlet or conduit box and a method of making the same by forming on a strip of flat material a plurality of blanks arranged with the bases of the outlet boxes in the center with rows of sidewalls extending parallel to each other along opposite sides of the strip of blanks. At least one sidewall for each outlet box blank is formed between the rows, between the adjacent bases, and extending perpendicular to the rows, so as to save space on the strip. Nailing tabs may be formed integrally with the base.

6 Claims, 4 Drawing Figures

ELECTRICAL OUTLET BOX

This invention relates to outlet or conduit boxes for electrical connections, switches and the like, and in particular it relates to a new and improved electrical outlet box and a method for making the same, the method including forming blanks of the outlet box on a strip of material.

Electrical outlet boxes are normally manufactured by pressing, stamping, drawing or forming a flat blank into the finished shape, all holes and waste material knock outs being punched out after the box has been formed into said finished shape. Consequently, the various machines required to manufacture the box are extremely complex. In addition, a major disadvantage is that there is a high percentage of waste material which must be left around the blank before it is pressed, stamped or drawn, which is then cut off when the box is formed. A wastage of about 20% of the overall material is common and it will be apparent that this definitely affects the price of the finished product.

An improved procedure is known, as shown in the Buckels U.S. Pat. No. 2,031,689, wherein a blank containing all parts of the finished conduit box is punched out, as are the various holes while the blank is still in the flat condition. Subsequently, this flat blank is folded into the finished conduit box. This known procedure solves certain of the above described disadvantages. In particular, it eliminates the complicated machinery required to press out the final shape of the conduit box from a flat blank and then subsequently form the holes and knock outs. However, this known procedure for forming the entire conduit box by first forming a complete flat blank still has the disadvantage that there is considerable waste material, which of course clearly adversely affects the price of the finished product.

Thus, it is a purpose of this invention to provide, in the manufacture of outlet boxes, an improvement which will permit the use of the flat blank procedure as described in the said Buckels patent wherein the forming machinery may be relatively simple, but wherein waste material is substantially reduced, thereby substantially reducing the cost of the finished article.

Furthermore, the present invention provides an outlet box which is an equal or better substitute for the outlet box known in the trade as an "Octagon" outlet box.

In accordance with a first aspect of the invention, there is provided an outlet box having a bottom and a plurality of essentially flat walls formed from a flat sheet, at least one of the walls being first type walls which are integral with the base and folded upwardly therefrom, at least some of the remaining walls being second type walls integral with said first type walls and folded relative thereto about the base, and including third type walls which are formed as separate pieces from said first and second walls and which are connected at each lateral edge thereof to an adjacent lateral edge of the adjacent first or second type wall.

In accordance with another aspect of the invention, there is provided a method for forming an outlet box comprising: locating on a flat strip a plurality of outlet box blanks, each including a base in the central portion thereof, two rows of sidewalls extending parallel to each other along opposite sides of the blank, each row integral with the base along a portion thereof which will be folded up to form first type sidewalls, said row including other second type walls connected integrally to the first type sidewalls to form other walls of the box, and including at least one third type sidewall located adjacent the base between the rows, that dimension of the third type sidewall which will be perpendicular to the base in the assembled box extending in the blank perpendicular to said parallel rows; said method further including cutting out the blanks with the said base, first and second type walls forming a single piece and the said third walls being completely separate pieces, folding up the first walls, folding the second walls perpendicular to the first sidewalls such that they extend about the base, and attaching the side edges of the third walls to abutting edges of the abutting first or second walls to close off the sidewalls of the outlet box.

In accordance with another aspect of the invention, there is provided an elongated strip comprising a plurality of outlet box blanks therealong, each blank including a base located centrally on the strip and a row of sidewalls extending parallel to each other along the edges of the strip, each row including first type sidewalls integral with the base and second type sidewalls integral with the first type sidewalls, the adjacent rows of adjacent blanks on the strip essentially abutting each other, and including third type sidewalls located between the rows and between the bases of the adjacent blanks, the dimension of the third type sidewalls which will be perpendicular to the base in the assembled state extending perpendicular to the elongation of the strip, whereby the third sidewall must be completely punched out and reoriented to serve as a sidewall of the outlet box.

In accordance with another aspect of the invention there is provided a new and improved individual blank for making an outlet box, the portions of the outlet box being arranged on the blank as described in the preceding paragraph.

In accordance with a preferred arrangement, the outlet box has eight sides, and when formed, each of the rows adjacent the base includes three sides including a first type sidewall integral with the base and second type sidewalls integral with each side of the first type sidewall. The third type sidewalls which will form two opposite sidewalls of the finished outlet box spaced 90° from the two first type sidewalls are located on the blank extending thereacross perpendicular to said rows and aligned with each other.

In accordance with another feature of the invention, a nailing device is formed from tabs which are integral with the base in an area which has a second type sidewall associated therewith, which space would otherwise be waste material.

The objects and advantages of the invention will become apparent from the detailed description to follow, together with the accompanying drawings in which.

The preferred embodiment of the invention will now be described in detail with reference to the drawings wherein like numerals represent like elements throughout the several views.

Figure 1:
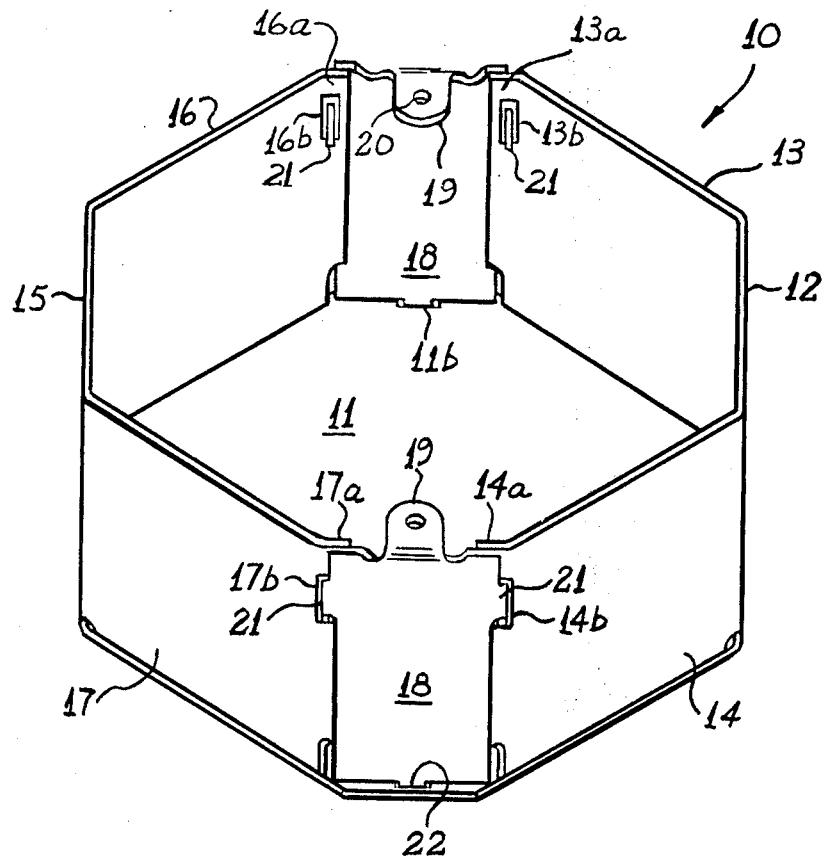
FIG. 1 is a perspective view showing the finished, assembled outlet box of the present invention.

FIG. 1 illustrates the finished outlet box 10 which comprises a base 11 having openings 11*b* therein for receiving a tab as will be described in greater detail below. The two sidewalls 12 and 15 are integral at their bottoms with the base 11. The sidewalls 13 and 14 are integral only with the sidewall 12, while the sidewalls 16 and 17 are integral only with the sidewall 15. Each of the sidewalls 13, 14, 16 and 17 includes at its outer ends, i.e. the ends remote from their respective sidewalls 12 or 15, angled portions 13*a*, 14*a*, 16*a* and 17*a*, respectively and tab receiving openings 13*b*, 14*b*, 16*b* and 17*b*, respectively. The two remaining sidewalls 18 are completely separate pieces attached to the remaining sidewalls and the base in a suitable manner. As illustrated in FIG. 1, the sidewalls 18 include a lower tab 22 which projects downwardly through the corresponding opening 11*b* in the base 11 and also upper side tab 21, one on each side, extending into appropriate ones of the sidewall openings 13*b*, 14*b*, 16*b* or 17*b*. The side edges of the sidewall 18 lie over and against the respective angled portions 13*a*, 14*a*, 16*a* or 17*a*. The sidewalls 18 further include top tabs 19 which are bent to extend horizontally across the open top of the outlet box, these tabs including threaded openings 20 for receiving a cover plate.

Thus, it will be seen that the preferred embodiment of the invention comprises an outlet box having eight sides, all of which are formed essentially from flat surfaces, and all of which are economically formed from a single blank as will be described in greater detail below.

Figure 2:
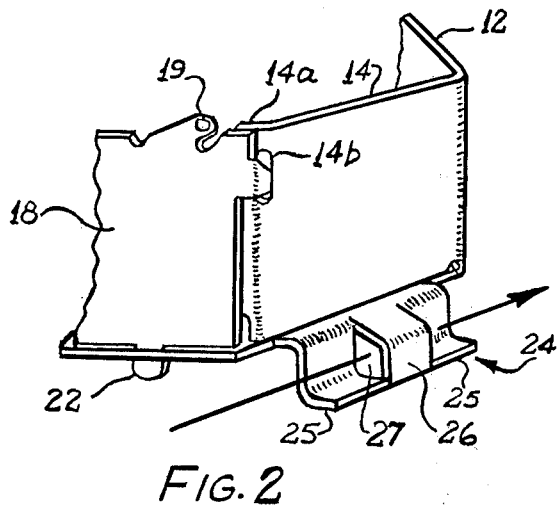
FIG. 2 shows a portion of FIG. 1 modified to include a nailing device.
Figure 2A:
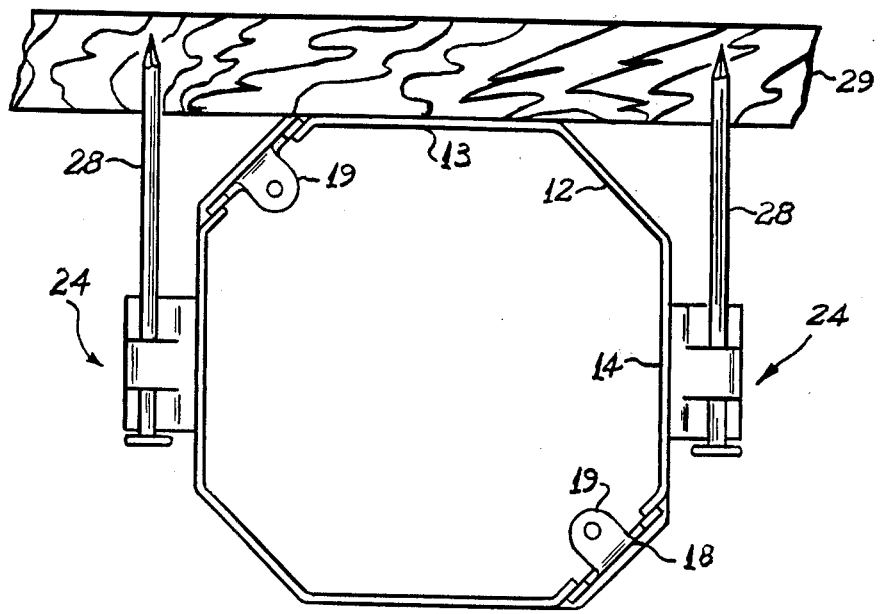
FIG. 2a illustrates schematically an outlet box of the present invention illustrating the use of the nailing device of FIG. 2.

FIG. 2 illustrates a modification of the invention including a nailing device 24. Initially, this device is simply a number of outwardly extending tabs 25 and 26 flat and integral with the base 11. However, these tabs are subsequently formed to the shape as shown in FIG. 2 including a pair of concave or convex outer tabs 25 with a convex or concave central tab 26. These outer tabs 25 and the central tab 26 form therebetween a slot 27 for receiving a nail. These tabs 25 and 26 are preferably formed so that the slot 27 is slightly smaller than the diameter of a desired standard nail. This serves to exert pressure on a nail inserted therein, thus preventing the nail from falling out during the installation of the outlet through the slots 27, for example for connecting the outlet box to a wood beam 29.

Figure 3:
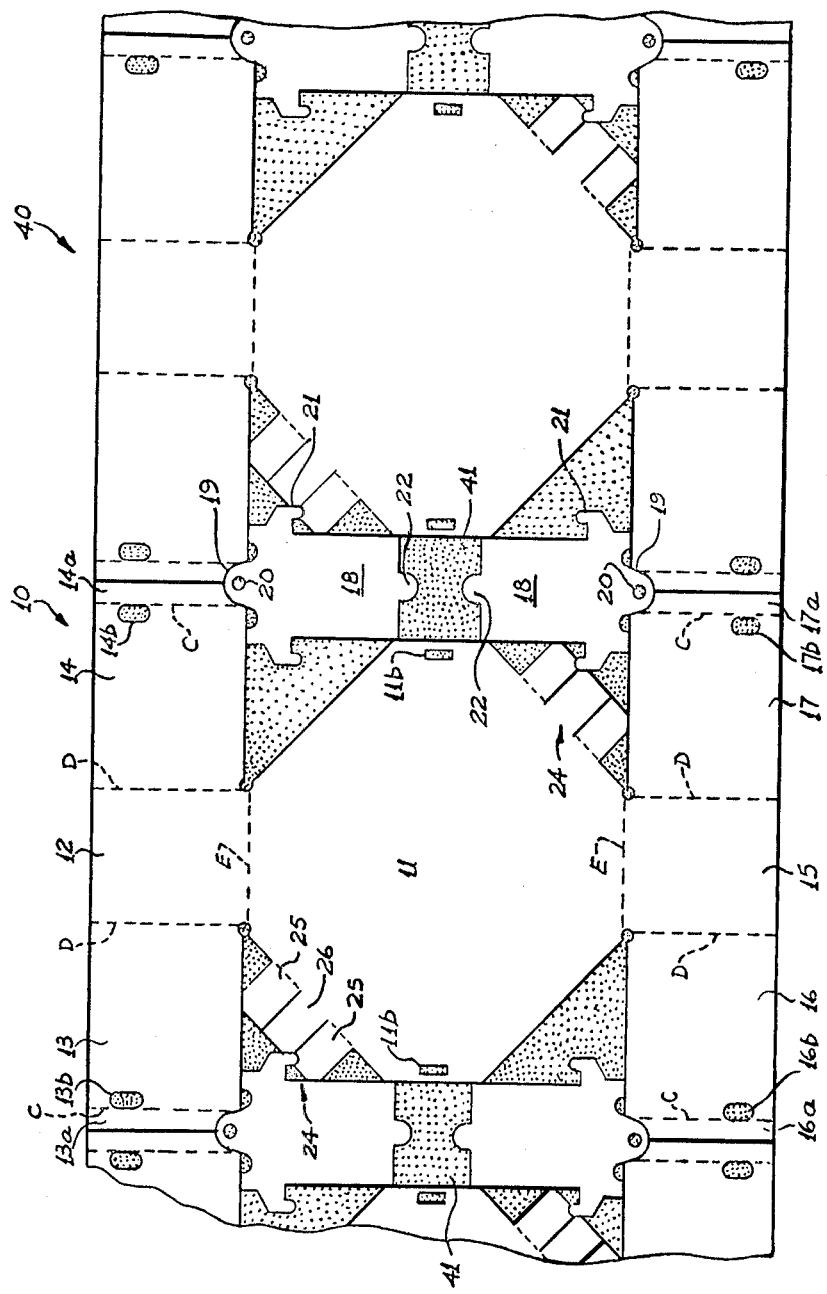
FIG. 3 illustrates a strip of suitable material wherein two blanks for forming two outlet boxes are shown with pieces of adjacent outlet box blanks. The waste material associated therewith is represented as speckled areas.

FIG. 3 illustrates a portion of a strip 40 from which the blanks for forming the outlet box 10 are shown. In FIG. 3, all of the portions of the blank corresponding to the portions in FIG. 1 are represented by the same numerals and hence these portions will be apparent. In addition, there is shown in FIG. 3 lines C, D and E along each of which the material is to be folded. Elements 41 comprise connecting tabs for connecting together adjacent blanks in the strip so that the blanks will be connected together to facilitate carrying the strip from station to station until the final steps of stamping the outlet box have been completed, at which time the elements 41 can be removed. It will be noted that the two separate end pieces 18 are stamped from a location which would most likely form scrap material. These pieces 18 are the only portions of a given outlet box blank which are punched completely out of the blank and then appropriately positioned for use at a later stage in the formation of the outlet box.

The method of forming the outlet box is as follows. First of all, a sheet of material such as sheet steel is fed to a blanking press and blanks are cut out as indicated by the lines in FIG. 3. The two end pieces 18 fall into a separate pan where they are used subsequently in the assembly of the outlet box. The two elements 41 are not cut out, but rather these portions link the blanks together so that adjacent outlet boxes are joined together in one strip and advance from one station on the press to another. Within the required stations the press stamps out all of the different holes, impressions and knock outs. These holes, impressions and knock outs, which have been omitted from the drawings, include any possible combination of knock outs for cable or conduit openings of any practical size on all eight of the octagonal sides and the bottom face or base of the outlet box. These operations may be done before the two end pieces 18 are cut out, as a result of which the knock outs can also be stamped in these end pieces 18. One significant advantage of the present outlet box is that the knock outs may be stamped out before the outlet box is shaped, whereby these stamping operations can be preformed in one operation in one plane rather than in several planes. Furthermore, the fact that the box has eight flat side surfaces enables the knock outs to be provided on each of the side surfaces. In some previous boxes having four flat sides and four curved sides, obviously only the four flat sides could be used. The next step is the bending of the sidewalls. Each lateral edge of each of the angled portions 13*a*, 14*a*, 16*a* and 17*a* are bent upwardly about lines C. The sidewalls 13, 14, 16 and 17 are bent upwardly about the lines D; specifically, sidewalls 13 and 14 are bent upwardly about line D relative to sidewall 12 while sidewalls 16 and 17 are bent upwardly around sidewall 15. Next, the sidewalls 12 and 15 are bent upwardly 90° about dotted line E. The end pieces 18 are then inserted in place between and interconnecting sidewalls 14 and 17 and between and interconnecting sidewalls 13 and 16. Lower tabs 22 after having been passed through opening 11*b* during the insertion of sides 18, are riveted over by the press simultaneously as the joining element 41 is punched clear of the main strip freeing a completely stamped and electrical outlet box. The upper side tabs 21 pass through the side wall openings 13*b*, 14*b*, 16*b* or 17*b* and are riveted over by the press at the same time as the top tab 19 is bent at 90°. The outlet box is then complete as shown in FIG. 1.

If desired, nailing device 24 may be formed. As is evident from FIG. 3, tabs 25 and 26 are formed in an area which would otherwise be waste material. Thus, the added cost for adding these tabs is quite insignificant, especially when compared with the prior art which generally provides adding on a suitable nailing bracket by welding or the like.

The outlet box will preferably be made out of pre-galvanized steel. This is a distinct advantage over conventional outlet boxes as it is not possible to use pre-galvanized steel in the drawn boxes.

Many variations are possible within the spirit and scope of the invention. For example, by extending the width of the initial material that is fed to the press, the box can be made deeper. In such a case, joining strip 41 becomes narrower so that the end pieces 18 are the same length as the height of the box. If necessary, the two end pieces 18 could be left as joining strips in place of strips 41 until the complete box is assembled, after which they would be removed and inserted in place. This would be a further saving in material but it would of course require an initial store of end pieces 18. Further, although the end pieces 18 are shown as having tabs for connection to adjacent sidewalls, these tabs could be replaced by a spot welding arrangement, a riveting arrangement, or the like. Even this would keep the cost of the outlet boxes of the present invention below the cost of the conventional octagon outlet boxes.

Although the invention has been described in considerable detail with respect to a preferred embodiment, it will be apparent that the invention is capable of numerous modifications and variations apparent to those skilled in the art, without departing from the spirit and the scope of the invention.

The embodiments of the invention in which an exclusive property or privilege is claimed are defined as follows:

1. An electrical outlet box, comprising:
   a. a flat base having a polygonally shaped periphery determined by a plurality of straight edges disposed at an angle with respect to each other,
   b. at least one rectangular side wall disposed perpendicular to the base plate and integrally joined thereto along a bottom side which is a fold line coincident with one of the base straight edges,
   c. at least one second rectangular side wall perpendicular to the base and integrally connected to the first rectangular side wall along a side which is a fold line determining a common side between the first and second rectangular side walls,
   d. the angular disposition between the first and second rectangular side walls at the fold line being the same as the angle between the base fold line straight edge and the adjacent straight edge below the side wall, so that the adjacent side edges of the base and the second rectangular wall are in alignment and together form a corner of the outlet box,
   e. a separate piece rectangular side wall which is disposed in a plane perpendicular with the base with its bottom edge engaging the base and adjacent and parallel to the corresponding base straight edge,
   f. the separate piece rectangular side wall having its sides disposed adjacent to the free side of the second rectangular side wall, one of such sides including a tab projection, and the other side wall having an opening into which such tab fits, and the bottom edge and the base have interengaging means for holding the separate piece rectangular side wall in locked position such that is also supports the adjacent walls to which it is interengaged.

2. The electrical outlet box as set forth in claim 1, wherein:
   a. each tab on the adjacent side wall has a hook which extends in a downward direction toward the base.

3. The electrical outlet box as set forth in claim 1, wherein:
   a. the separate piece rectangular side wall has cover plate fastener receiving means disposed along its upper edge.

4. The electrical outlet box as set forth in claim 1, wherein:
   a. outlet box supporting means is formed integrally with the base for supporting the box, and for receiving and holding an elongated fastener in rigid aligned position with respect to the box prior to its installation.

5. The outlet box as set forth in claim 1, wherein:
   a. the outlet box supporting means are formed integrally with the base and said supporting means extends outwardly from the outlet box immediately adjacent one of the side edges of the outlet box.

6. The electrical outlet box as set forth in claim 1, wherein:
   a. the outlet box includes outlet box supporting means, said supporting means including opposed curved gripping tabs forming a slot which is slightly smaller than the diameter of a desired nail for gripping the nail in a tight sliding fit.

* * * * *